(12) United States Patent
O'Brien et al.

(10) Patent No.: US 7,967,262 B2
(45) Date of Patent: Jun. 28, 2011

(54) PORTABLE ELECTRONIC DEVICE MOUNT

(75) Inventors: Darren Kelly O'Brien, Apple Valley, CA (US); Dannie C. Lau, Santa Clara, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 206 days.

(21) Appl. No.: 11/967,397

(22) Filed: Dec. 31, 2007

(65) Prior Publication Data

US 2009/0168308 A1 Jul. 2, 2009

(51) Int. Cl.
*A45D 42/14* (2006.01)
(52) U.S. Cl. ............. 248/205.5; 248/288.31; 248/309.1; 248/309.3
(58) Field of Classification Search ................... 248/683, 248/205.5, 205.8, 208, 288.31, 316.7, 671, 248/309.3, 309.1
See application file for complete search history.

(56) References Cited

U.S. PATENT DOCUMENTS

| | | | | |
|---|---|---|---|---|
| 6,149,116 A * | 11/2000 | Won | ............................ | 248/309.4 |
| 7,007,908 B2 * | 3/2006 | Tsay | ............................ | 248/309.3 |
| 7,239,942 B2 * | 7/2007 | Park et al. | ............................ | 701/1 |
| 7,441,734 B2 * | 10/2008 | Liou | ............................ | 248/205.5 |
| 7,475,858 B2 * | 1/2009 | Kalis et al. | ............................ | 248/288.31 |
| 2005/0121579 A1 * | 6/2005 | Rim et al. | ............................ | 248/288.11 |

OTHER PUBLICATIONS

Garmin Owner's Manual, nüvi® 680, personal travel assistant, 60 pages, Jun. 2007.
Garmin, Quick Reference Guide, nüvi® 600/650, personal travel assistant, 6 pages, Mar. 2007.
Garmin, Owner's Manual, nüvi® 600/650, personal travel assistant, 49 pages, Mar. 2007.
Garmin, Quick Reference Guide, nüvi® 300/350, personal travel assistant, 8 pages, Nov. 2006.
Garmin, Owner's Manual, nüvi® 300/350, personal travel assistant, 79 pages, Sep. 2006.

* cited by examiner

*Primary Examiner* — Terrell McKinnon
*Assistant Examiner* — Bradley H Duckworth
(74) *Attorney, Agent, or Firm* — Brinks Hofer Gilson & Lione

(57) ABSTRACT

A portable electronic device mount provides a secure attachment point for a personal navigation device, or other electronic device. The mount provides access to the device electronics through interface ports and feature connectors. The mount connects to an attachment mechanism that firmly and reliably attaches the mount to a windshield or other surface. The mount also includes a flexible linkage through which the mounted device may be securely oriented over a wide range of positions. In addition, extendible and retractable extension arms help achieve a compact form factor for convenient carrying and storage of the mount.

21 Claims, 17 Drawing Sheets

PORTABLE ELECTRONIC DEVICE MOUNT

BACKGROUND OF THE INVENTION

1. Technical Field

This disclosure relates to a mechanical mount for a portable electronic device.

2. Related Art

Rapid developments in modern technology have led to the widespread adoption of sophisticated portable electronic devices. These devices include personal navigation devices (PNDs), music players, satellite radio receivers, and other devices. Manufacturers have also produced ergonomic mounts into which the device may be secured. For example, a PND may have a mount that attaches to the windshield of a vehicle and that permits the driver to readily view the PND while driving.

However, prior mounts had drawbacks. In some cases, the mounts did not seal or attach effectively, because of, as one example, an unreliable connection to a windshield. In other cases, the mounts had limited positional capability, making it difficult to position the portable electronic device precisely where desired. Furthermore, prior mounts were often bulky to carry and store, and were plagued by loose connections that permitted the portable electronic device to rattle while attached to the mount.

Therefore, a need exists for an improved mount that addresses the problems noted above and other previously encountered.

SUMMARY

A portable electronic device mount provides a secure attachment point for a personal navigation device, or other electronic device. The mount connects to an attachment mechanism that firmly and reliably attaches the mount to a windshield or other surface. The mount also includes a flexible linkage through which the mounted device may be securely oriented in a wide range of positions. A collapsible arm system helps achieve a small form factor for convenient carrying and storage of the mount.

In one implementation, the portable electronic device mount ("mount") includes a backrest, a locking tab on the backrest, and a lock release button. The mount also includes a lock release mechanism coupled between the lock release button and the locking tab, a portable electronic device mating guide positioned on the backrest opposite the locking tab, and an electronics interface adjacent the locking tab.

The mount may include multiple locking tabs. In one design, two locking tabs are provided on the back rest, and the locking tabs are positioned on opposite sides of and adjacent to the electronics interface. In addition, vibration dampers on the backrest may help reduce mechanical rattling when the device is inserted into the mount. The vibration dampers may be placed above and adjacent the locking tabs, or in other locations. The electronics interface may be a two dimensional pin array. The pins may be individually spring-loaded conductive pins arranged to press against exposed contact pads on the electronic device, when the electronic device is inserted into the mount.

The mount may also include a socket behind the backrest and a ball disposed in the socket. A spring in the socket biases the ball against the socket to help the mount retain the position set by the user. The spring may be a flat spring, formed from sheet metal or other resilient material.

An attachment mechanism for the mount securely connects the mount to a surface, such as a windshield. The attachment mechanism may include a support structure defining a chamber and a sealing structure, a deformable membrane covering the chamber and extending beyond the sealing structure, and a piston in the support structure and coupled to the deformable membrane. A piston lever is coupled to the piston and, when depressed, displaces the piston and draws the membrane into the chamber. The result is a vacuum seal against the mounting surface (e.g., the windshield). A flange coupled to the membrane assists with moving or removing the mount from the mounting surface.

The attachment mechanism may include a spring to bias the piston into a position in which the membrane is not drawn into the chamber. The piston moves in an opening that receives the piston. A pin connected to the piston may also connect to the piston lever. The piston lever includes a lever lock that rotates into a locked position when the lever arm is sufficiently displaced (e.g., rotated through 90 degrees). For example, the lever lock may include an unlocked edge, a locked edge, and an edge transition that transitions the unlocked edge into the locked edge.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The mount may be better understood with reference to the following drawings and description. The elements in the figures are not necessarily to scale, emphasis instead being placed upon illustrating the principles of the system. In the figures, like-referenced numerals designate corresponding parts throughout the different views.

DETAILED DESCRIPTION OF THE PREFERRED EMBODIMENTS

Figure 1:
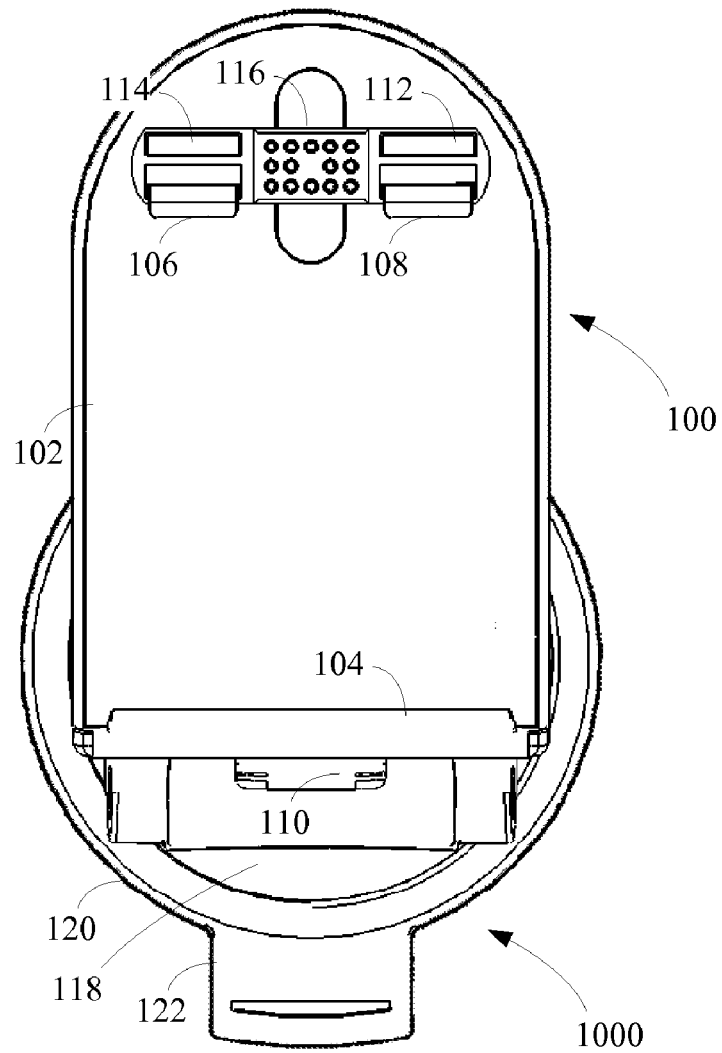
FIG. 1 shows a front view of a portable electronic device mount and attachment mechanism.

FIG. 1 shows a top view of a portable electronic device mount ("mount") 100 and attachment mechanism 1000. The mount 100 includes a backrest 102 against which a portable electronic device may sit when secured into the mount 100. The backrest 102 includes a mating guide 104, a first locking tab 106, a second locking tab 108, and a lock release button 110. A lock release mechanism (described below) connects the lock release button 110 and the locking tabs 106 and 108. The lock release button 110 and mating guide 104 are disposed near the bottom side of the backrest 102, while the locking tabs 106 and 108 are disposed opposite, near the top side of the backrest 102. The lock release button 110 and locking release tabs 106 and 108 may be located in other spatial relationships and in other locations on the backrest 102. The spatial relationship shown in FIG. 1 facilitates convenient and ergonomic one-handed insertion and removal of the portable electronic device.

The mount 100 also includes a portable electronics device mating guide 104. The mating guide 104 is located near the bottom of the backrest 102, but may be located in other places on the backrest 102. The mating guide 104 aligns with an aperture location in the portable electronic device to guide the device into the mount 100. In the example shown in FIG. 1, the mating guide 104 takes the form of a longitudinal ridge or lip of material that mates with a slot in the portable electronic device. The mating guide 104 may take many other forms, however, such as one or more mating posts or holes, ridges or lips of material or slots, or other positive location structures.

The mount 100 also includes vibration dampers 112 and 114 on the backrest. The vibration dampers 112 and 114 buffer the electronics device against the backrest 102. As a result, the vibration dampers 112 and 114 help reduce the adverse effects of vibration and physical jarring of the electronics device against the backrest 102. Rubber, foam, or other dampening materials are suitable for the material used for the vibration dampers 112 and 114. The vibration dampers 112 and 114 are located immediately above their respective locking tabs 106 and 108 and may be approximately 0.5 mm thick. However, vibration dampers may be located in additional, fewer, or different locations on the backrest 102 in additional, fewer, or different shapes, sizes, thicknesses and orientations.

An electronics interface 116 is also present on the mount 100. The electronics interface 116 may be disposed between the locking tabs 106 and 108. In one implementation, the locking tabs 106 and 108 are immediately adjacent the electronics interface 116 and thereby help to ensure a reliable connection to the portable electronic device. The electronics interface 116 may be implemented with one or more conductors. In the example shown in FIG. 1, the electronics interface 116 is a 5×3 array of spring-loaded conductive pins (e.g., Pogo pins), with the center pin removed (e.g., to provide a keying location). The electronics interface 116 may use any other pin configuration. The array may be densely packed in one or more dimensions to provide a significant number of electrical connection points without consuming an undue amount of physical space. For example, the conductive pins have a constant or variable pitch spacing of between 0.35-2.54 mm, 0.35-0.65 mm, or any other range of spacing.

FIG. 1 also shows part of the attachment mechanism 1000. The support structure 1000 includes a support structure 118 positioned above a deformable membrane 120. A flange 122 provides a convenient handle for removing or positioning the attachment mechanism 1000. The flange 122 may be bent out of the plane of the deformable membrane 120 to facilitate interaction with the attachment mechanism 1000.

Figure 2:
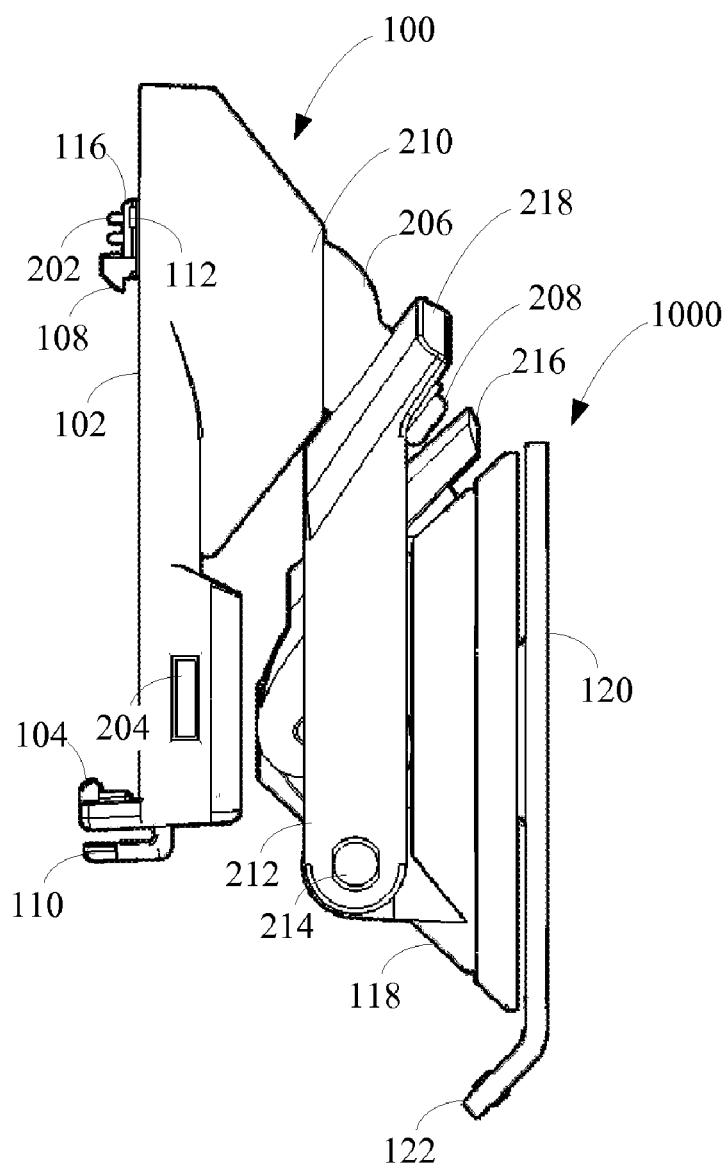
FIG. 2 shows a side view of a portable electronic device mount and attachment mechanism.

FIG. 2 shows a side view of the mount 100 and attachment mechanism 1000. FIG. 2 shows the side of the locking tab 108, with a locking edge extending downward for engaging a slot or other aperture in the portable electronic device. One or more conductive pins (e.g., the conductive pin 202) of the electronics interface 116 may electrically connect to the interface port 204. The interface port 204 thereby provides general purpose access to the portable electronics device when it is secured in the mount 100. The interface port 204 may provide a connection to any power or data signals desired and may facilitate operation and interaction with any desired feature of the portable electronic device secured in the mount 100. The interface port 204 may be a USB port, firewire port, proprietary port, or other interface port.

A ball 206 includes or is connected to an extension member that is secured with a fastener 208 (e.g., a screw or bolt) to an extension arm coupling 218. The ball 206 is disposed inside a socket 210 behind the backrest 102. The ball 206 and socket 210 provide a wide range of movement and positioning ability for the backrest 102. The extension arm 212 facilitates extendible and retractable linear positioning of the backrest 102 (e.g., closer to or farther from the viewer). The support structure 118 has a generally conical shape that allows the extension arm 212 and ball 206 to fold back against the support structure 118 to form a very compact and portable unit. The extension arm 212 connects to the attachment mechanism 1000 through the torque pin 214. A piston lever 216, illustrated in more detail below, facilitates securing the attachment mechanism 1000 to an attachment point, such as a windshield.

Figure 3:
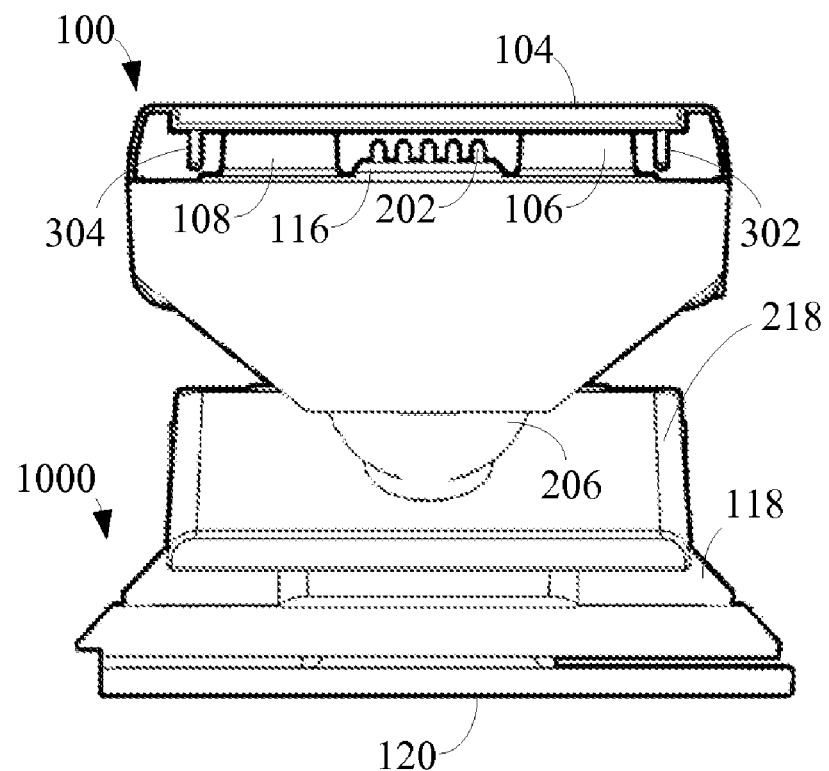
FIG. 3 shows an end view of a portable electronic device mount and attachment mechanism.
Figure 4:
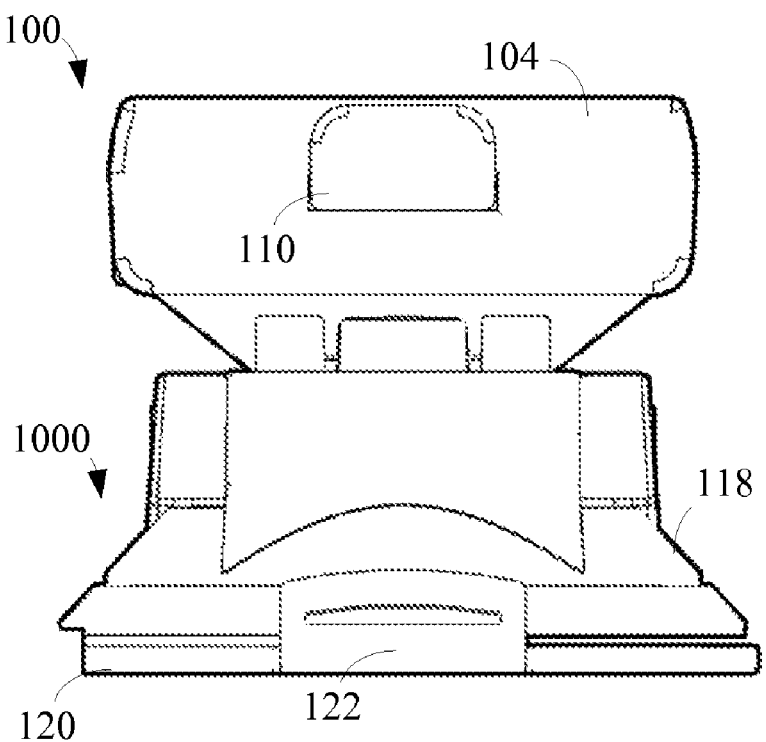
FIG. 4 shows an end view of a portable electronic device mount and attachment mechanism.
Figure 5:
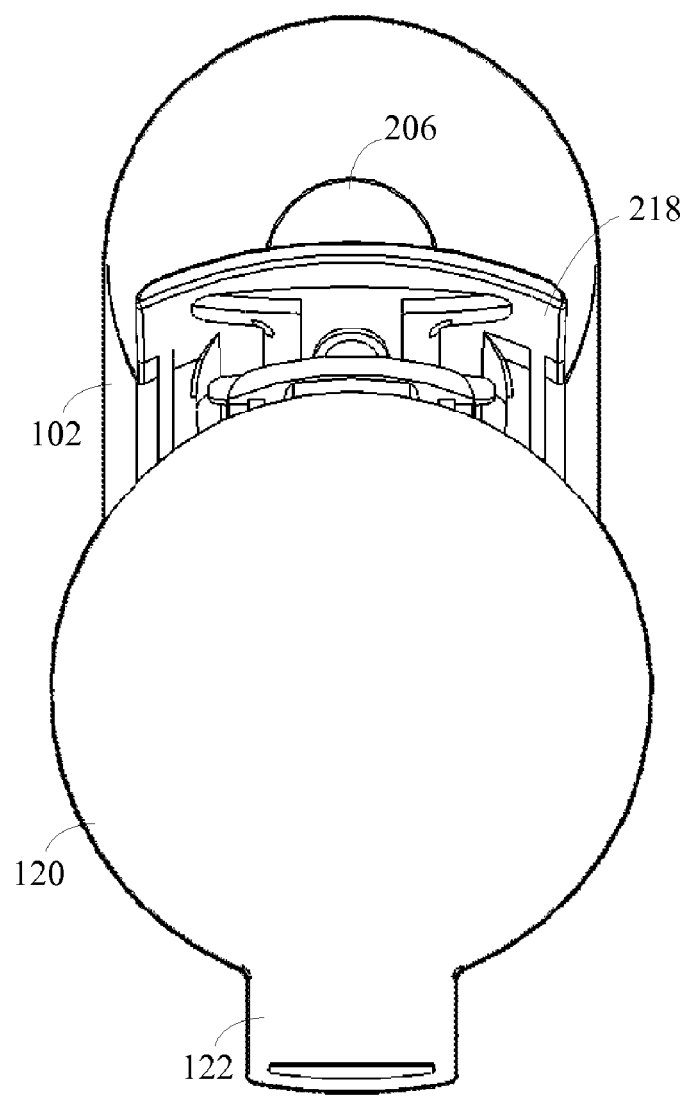
FIG. 5 shows a rear view of a portable electronic device mount and attachment mechanism.
Figure 6:
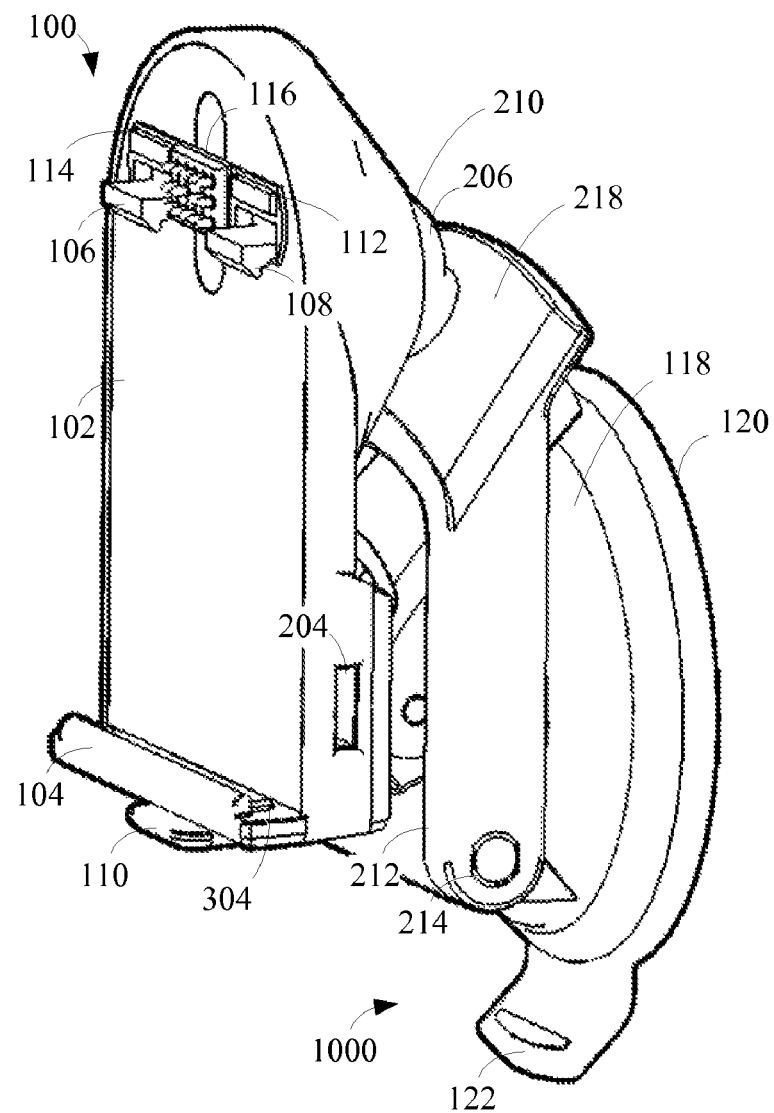
FIG. 6 shows a perspective view of a portable electronic device mount and attachment mechanism.

FIG. 3 shows an end view of the mount 100 and the attachment mechanism 1000. The optional standoffs 302 and 304 extend perpendicularly from the mating guide 104. The standoffs 302 and 304 may help dampen vibration effects on the portable electronic device. FIG. 4 shows another end view of the mount 100 and the attachment mechanism 1000. FIG. 5 shows a rear view of the mount 100 and the attachment mechanism 1000, including the deformable membrane 120 (shown in its flat state) and the flange 122. FIG. 6 shows a perspective view of the mount 100 and the attachment mechanism 1000.

Figure 7:
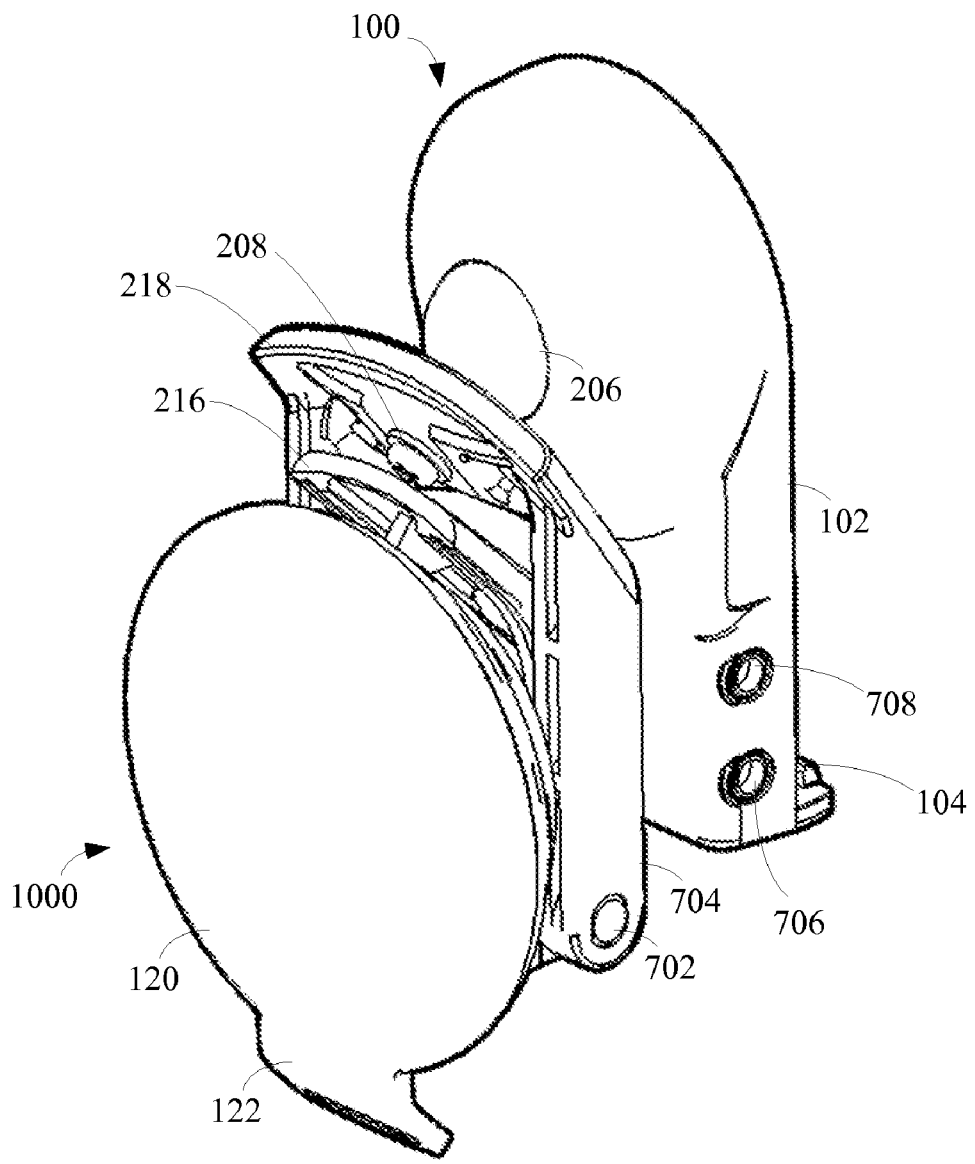
FIG. 7 shows a perspective view of a portable electronic device mount and attachment mechanism.

FIG. 7 shows a rear perspective view of the mount 100 and the attachment mechanism 1000. FIG. 7 illustrates a second extension arm 704 opposite the first extension arm 212. A second torque pin 702 secures the second extension arm 704 to the attachment mechanism 1000.

FIG. 7 also shows feature connectors 706 and 708 in the mount 100. The feature connectors 706 and 708 may connect to one or more pins in the electronics interface 116. The feature connector 706 may be an audio-out connector connected to the electronics interface 116. Accordingly, audio signals from the portable electronic device may be provided through the electronics interface 116 over the feature connector 706 for input to other devices, such as a line-in on a stereo, an FM modulator, or other device input.

The feature connector 708 may be an external microphone connector. An external microphone attached to the feature connector 708 may thereby be placed where it is desired, independent of the location of the portable electronic device mount 100. The feature connector 708 may also be an external antenna connector for enhanced reception of radio signals including traffic reports, radio data service data, or other broadcast information.

The feature connectors 706 and 708 provide freedom for the portable electronic device to be inserted into and removed from the mount 100 without requiring disconnection of external cables, such as an audio-out cable connected to an audio-out jack on the portable electronic device itself. Instead, the cables may remain in place in the mount 100, ready to fill their roles whenever the portable electronic device is present in the mount 100. Additional, fewer, or different feature connectors may be present in the mount 100 or the attachment point 1000.

Figure 8:
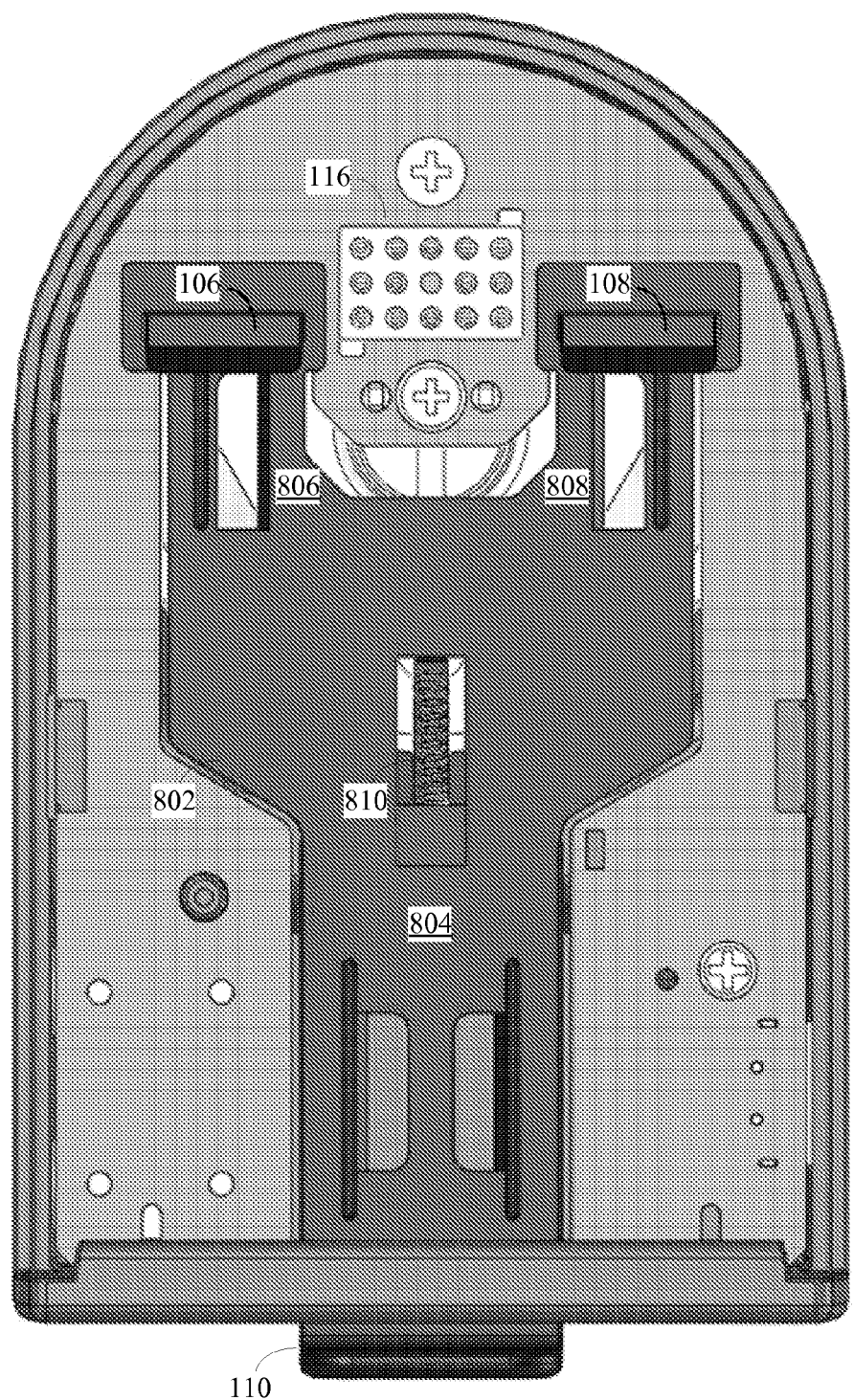
FIG. 8 shows a locking tab, lock release button, and a lock release mechanism.

FIG. 8 shows an internal view of the mount 100. The internal view reveals a lock release mechanism 802 connected between the lock release button 110 and the locking tabs 106 and 108. In the implementation shown in FIG. 8, the lock release mechanism 802 includes a central member 804 that braches in a Y-shape into a left arm 806 and a right arm 808. Each of the arms 806 and 808 displaces a corresponding locking tab 106 and 108. The release spring 810 biases the release mechanism into the locked position.

When inserted, the locking apertures on the back of the portable electronic device force the locking tabs 106 and 108 upward. At the same time, the guide 104 positively guides the portable electronic device into the proper position for secure mounting. When the locking tabs 106 and 108 have been sufficiently displaced, the portable electronic device snaps into place, with the locking tabs returning toward downward. The edges of the locking tabs 106 and 108 and the guide 104 hold the portable electronic device in place.

Figure 9:
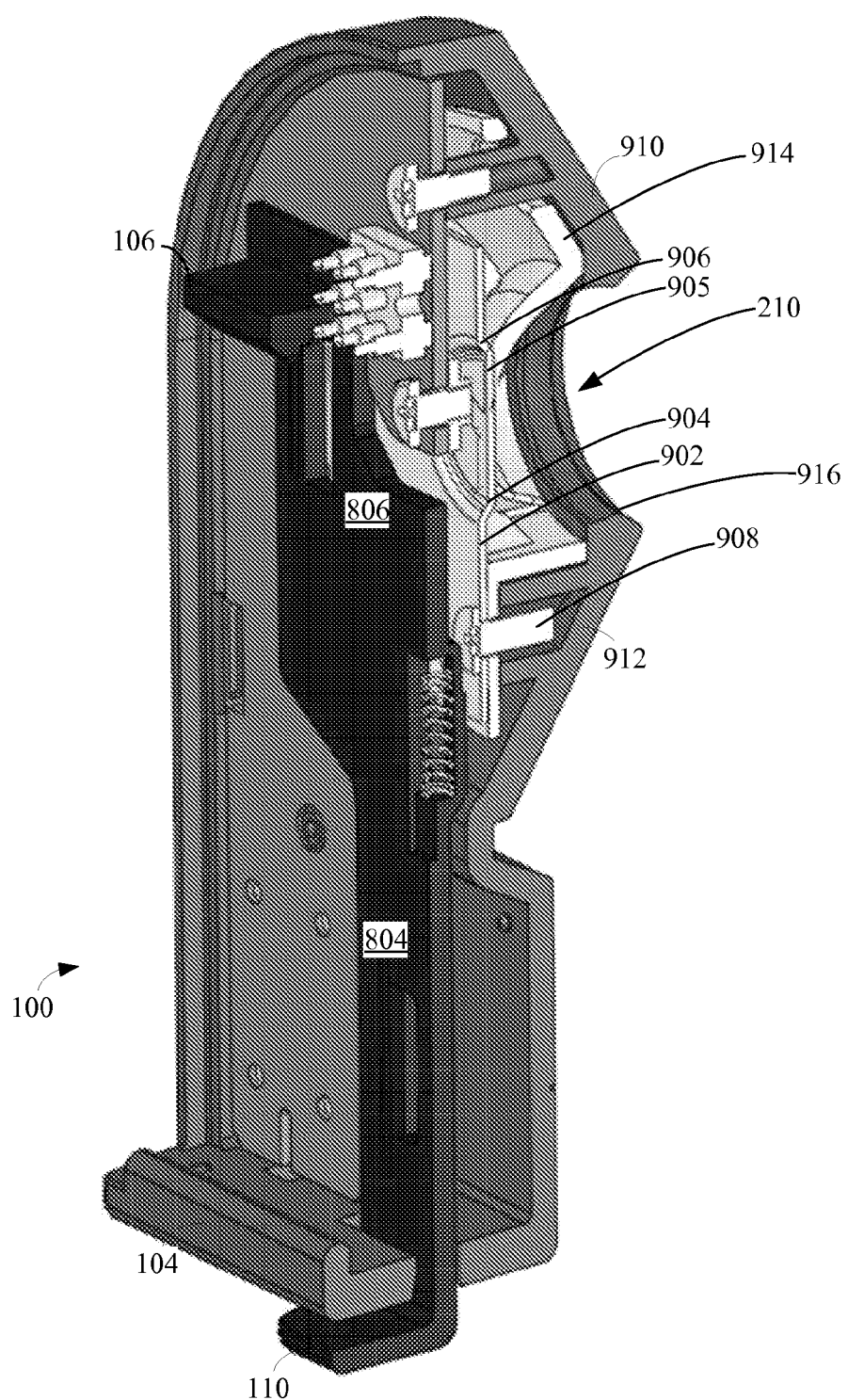
FIG. 9 shows a cross section view of a portable electronic device mount.

FIG. 9 shows a cross section of the mount 100. The cross section shows the generally conical cross section internal structure of the socket 210. In particular, the socket 210 is a generally hemispherical cavity formed in part by the angled walls 910 and 912. Inside the socket 210, a flat spring 902 provides bias for the ball 206 against the socket 210. In addition, a retaining shell 914 is in place between the flat spring 902 and the ball 206. The flat spring 902 may include bends 904 and 906 to enhance the spring action against the ball 206 by bringing the spring portion 905 into firm but flexible contact with the retaining shell 914 held against the ball 206. A fastener 908 holds the flat spring 902 and the retaining shell 914 in place. The flat spring 902 may be formed from a thin piece of sheet metal, for example between 1 to 5 mils thick.

The socket 210 may be dimensioned such that the socket 210 captures the ball 206 in the socket 210. The diameter of the opening 916 of the socket 210 may be chosen to prevent the ball 206 from popping out of the socket when the socket 210 is presented with any pre-estimated or pre-determined amount of force exerted when an operator orients the backrest of the mount 100. In other words, in one implementation, the socket 210 does not deliberately allow the ball 206 to freely pop in and out of the socket 210. In that regard, the ratio of the socket diameter to the ball diameter may be approximately 0.96 to 0.97. However, the socket diameter may be made smaller, as desired, to retain the ball 206 against any expected, measured, or simulated amount of force, such as the maximum forces expected or exerted when an operator repositions or re-orients the backrest of the mount. During assembly, when the mount 100 is not yet fully assembled, the ball 206 is placed against the socket opening, with an extension member extending to the extension arm coupling 218 and secured with the fastener 208.

Figure 10:
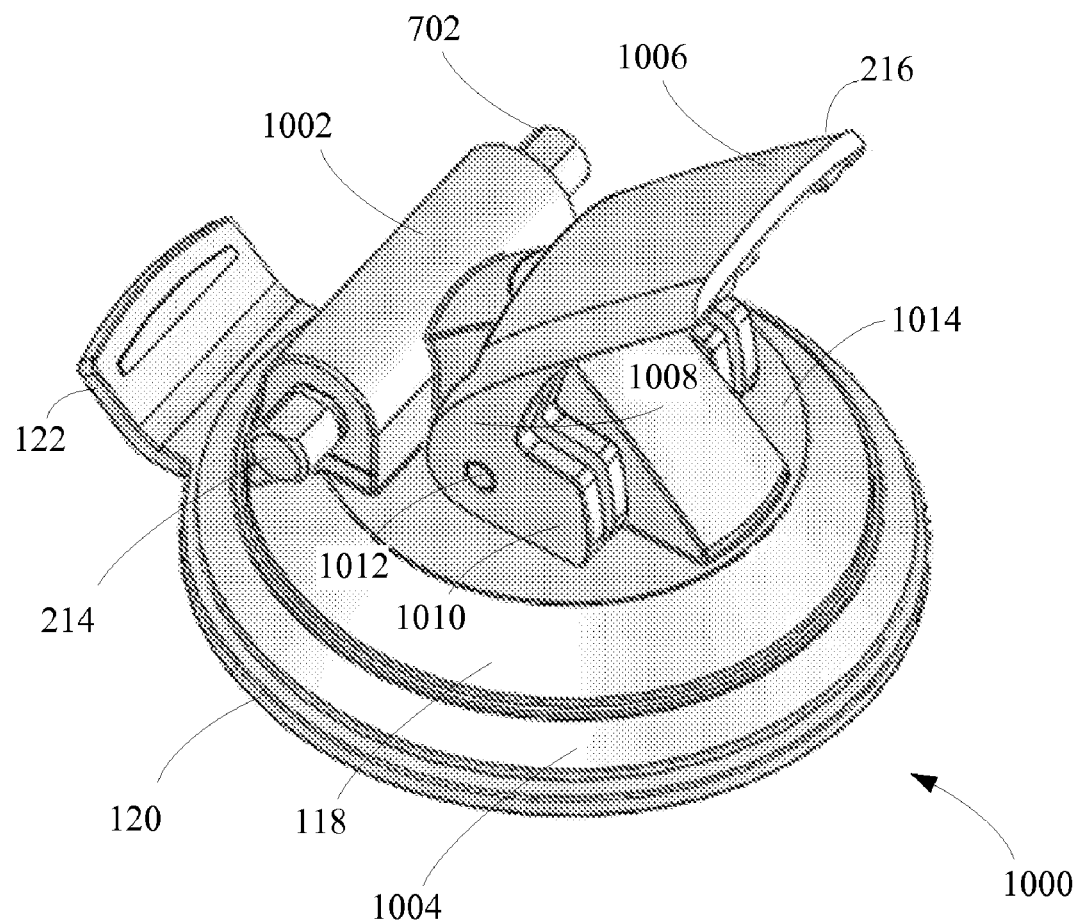
FIG. 10 shows a perspective view of an attachment mechanism.

FIG. 10 shows a perspective view of the attachment mechanism 1000. The mount 100 may connect to the attachment mechanism 1000 through the extension arms 212 and 704. The extension arms 212 and 704 connect to the torque pins 214 and 702 that are part of the torque assembly 1002. The attachment mechanism 1000 includes a support structure 118 that defines a chamber 1210 (FIG. 12) and includes a sealing structure 1004.

The support structure 118 provides a general support frame for the piston lever 216 and torque assembly 1002. The sealing structure 1004 may be a ring of material around the periphery of the support structure 118. The deformable membrane 120 extends outward beyond the sealing structure 1004.

A deformable membrane 120 covers the chamber 1210 and extends beyond the sealing structure 1004. The sealing structure 1004 clamps down on the deformable membrane 120 when the piston lever 216 is engaged. The sealing structure 1004 prevents air from flowing under the deformable membrane 120 to reach the interior of the chamber 1210, thereby causing a lack of vacuum pressure holding the attachment mechanism in place.

Regarding the structure of the piston lever 216, it includes an actuator tab 1006, a lever arm 1008, and a lever lock 1010. The lever lock 1010 extends at approximately a right angle with respect to the lever arm 1008. A piston coupling 1012 connects the piston lever 216 to an internal piston, and provides a rotation point for the piston lever 216. The piston coupling 1012 may be a pin, fastener, or other coupling structure connected to the internal piston. The lever lock 1010 rests on and rotates against the support surface 1014.

Figure 11:
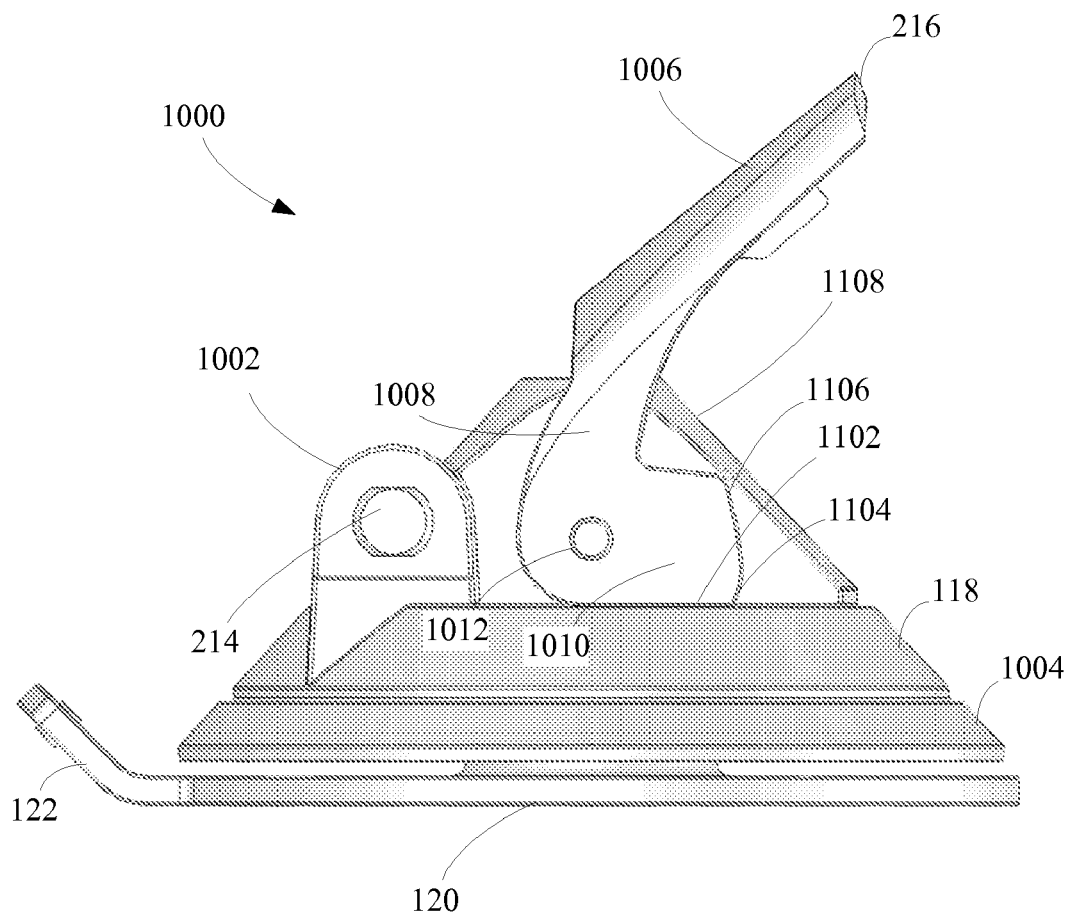
FIG. 11 shows a side view of an attachment mechanism.

FIG. 11 shows a side view of the attachment mechanism 1000. In particular, when the actuator tab 1006 is depressed, the lever lock 1010 rotates to displace its unlocked edge 1102 along the edge transition 1104 to place the locked edge 1106 against the support surface 1014. The edge transition 1104 may include curvature or other structure features that facilitate rotation of the lever lock into and out of the locked position. When the piston lever 216 is in the locked position, the actuator tab 1006 may align against or with the support structure surface 1108. The angle of the support structure surface 1108 helps provide a compact profile for the attachment mechanism, as shown in FIG. 2.

Figure 12:
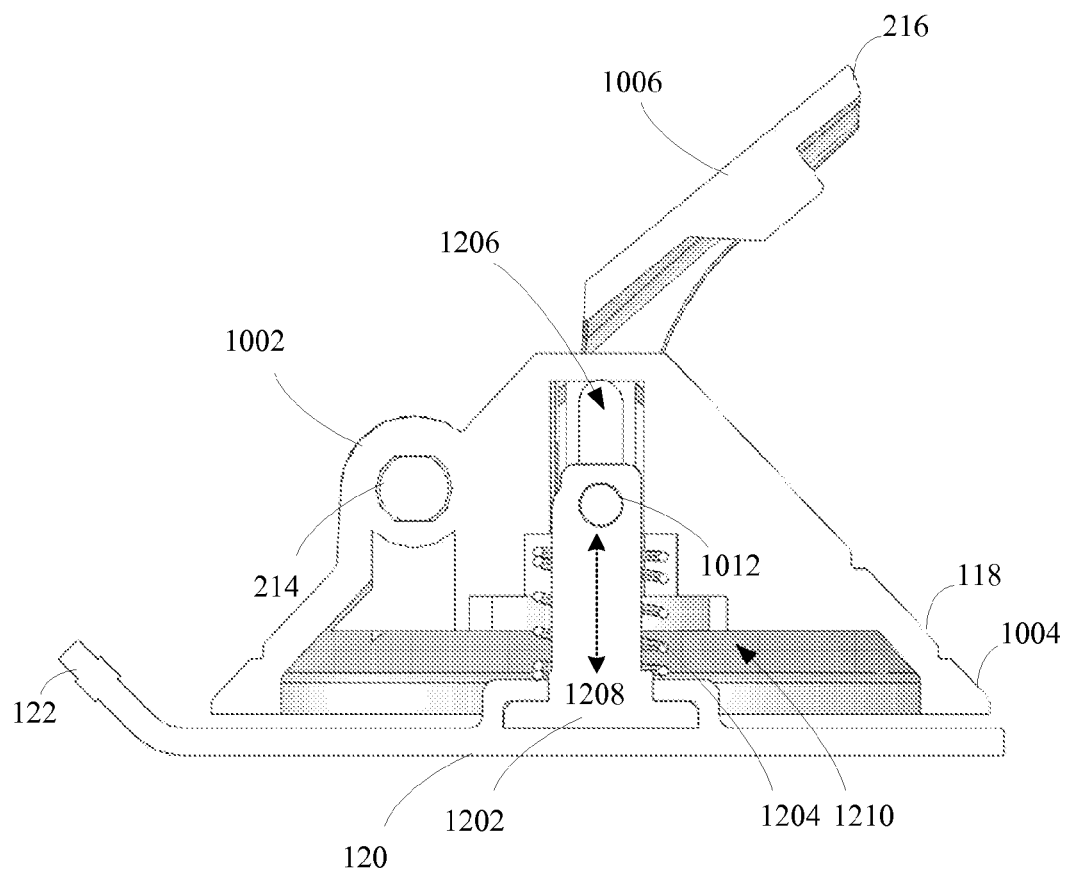
FIG. 12 shows a cutaway view of an attachment mechanism.

FIG. 12 shows a side sectional view of the attachment mechanism 1000. A piston 1202 in the support structure 118 is coupled to the deformable membrane 120. As an example, the piston 1202 may be encompassed in the membrane as part of a molding process, and may include side flanges to help retain connection with the deformable membrane 120. The piston 1202 may attach to the deformable membrane 120 in other manners however, such as though an adhesive, fastener, or other connection.

The piston lever 216 is connected to the piston 1202. The piston lever 216, when displaced, moves the piston 1202 in the opening 1206 along the line 1208. In turn, the piston 1202 draws the deformable membrane 120 into (and out of) the chamber 1210 while the sealing structure 1004 clamps down on the deformable membrane 120. The deformation of the deformable membrane 120 creates a space underneath the deformable membrane 120 that approximates a vacuum. Accordingly, external air pressure holds the attachment mechanism securely against the mounting surface. The piston lever 216 and piston 1202 may be arranged to provide approximately 6 mm of travel in the piston 1202 and generate a vacuum force of approximately 10 kgf to approximately 30 kgf, and in one implementation, approximately 20 kgf. This amount of vacuum force typically holds the attachment point 1000 very securely against the mounting surface.

The piston spring 1204 biases the piston 1202 into the lowered position. In the lowered position, the deformable membrane 120 is in its flat position. In the flat position the attachment mechanism can be more easily removed or repositioned on the mounting surface using the flange 122. In the locked position, the membrane is displaced into the chamber 1210 and vacuum pressure strongly holds the attachment mechanism 1000 to the attachment point. The lever lock 1010 holds the piston 1202 in locked position against the bias force generated by the piston spring 1204.

Figure 13:
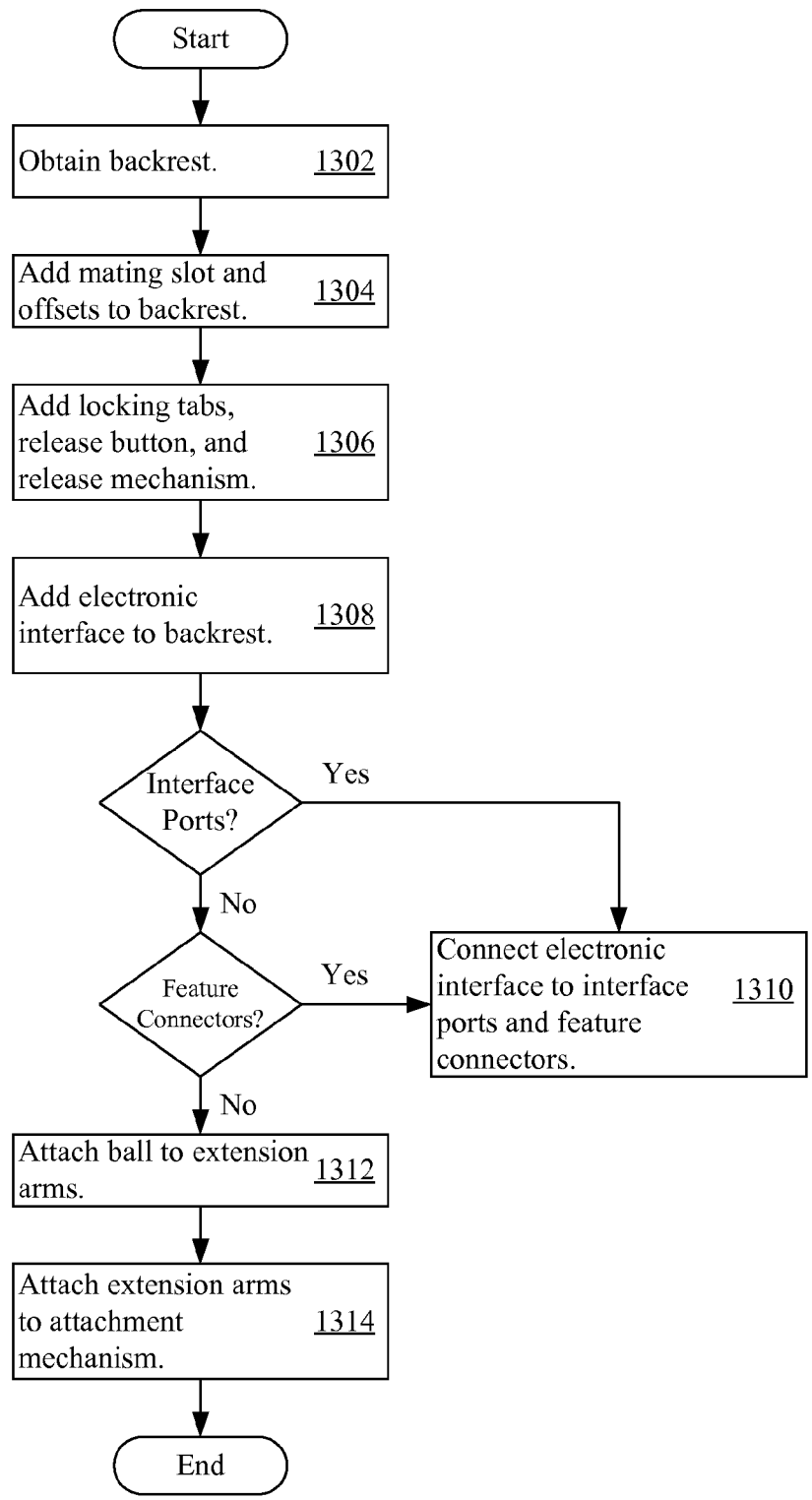
FIG. 13 shows a flow diagram of manufacturing a portable electronic device mount.

FIG. 13 provides a flow diagram for manufacture of the mount 100. The individual components of the mount may be formed from a wide range of materials, including general purpose plastics, metals, polymers, and other materials. A backrest 102 is obtained (1302). To the extent that the backrest 102 does not already include a mating slot 104 and offsets 302 and 304, these features may be added (1304). Similarly, during manufacture, the locking tabs 106 and 108, release button 110, and release mechanism 802 are added to the backrest 102 (1306). Furthermore, an electronic interface 106, vibration dampers 112 and 114, and other features may be added to the backrest 102 (1408).

As noted above, the mount 100 may include an interface port 204 or feature connectors 706 and 708. The electronic interface 116 is connected to the interface port 204 and feature connectors 706 and 708 (1310). The connections may be accomplished using circuit boards, flex cables, discrete wiring, or other interconnection mechanisms.

The ball 206 may be connected to the extension arms 212 and 704 (1312). To that end, a fastener 208 may secure an extension arm molded with or attached to the ball 206 into the extension arm coupling 218 connected to or integral with the extension arms 212 and 704. The extension arms 212 and 704 are connected to the attachment mechanism 1000 (1314) such as through torque pins.

Figure 14:
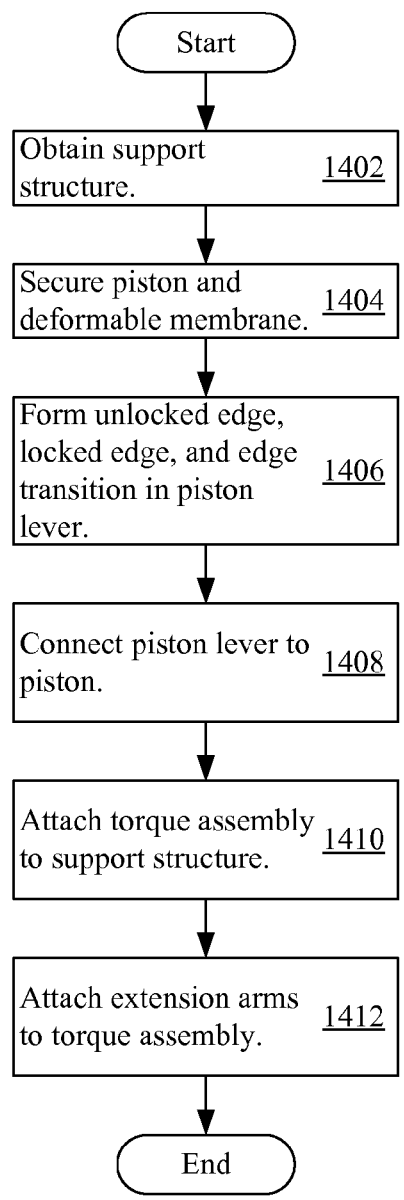
FIG. 14 shows a flow diagram of manufacturing an attachment mechanism.

FIG. 14 provides a flow diagram for manufacture of the attachment mechanism 1000. A support structure 118 is obtained (1402). A piston 1202 and deformable membrane 120 is secured in the support structure (1404), with a piston spring 1204 biasing the piston 1202. The support structure 118 may include the flange 122, or a flange may be separately secured to the deformable membrane.

With regard to the piston lever 216, an unlocked edge 1102, edge transition 1104, and locked edge 1106 are formed in the piston lever 216 (and specifically in the lever lock 1010) (1406) if not already present. The piston lever 216 is secured to the piston 1202 (1408). To that end, a piston coupling 1012 (e.g., a pin) may attach the piston lever 216 to the piston 1202.

In addition, the torque assembly 1002 is attached to the support structure 118 (1410). The torque assembly 1002 provides torque pins 214 and 702. The extension arms 212 and 704 may then be attached to the torque pins 214 and 702 (1412).

Figure 15:
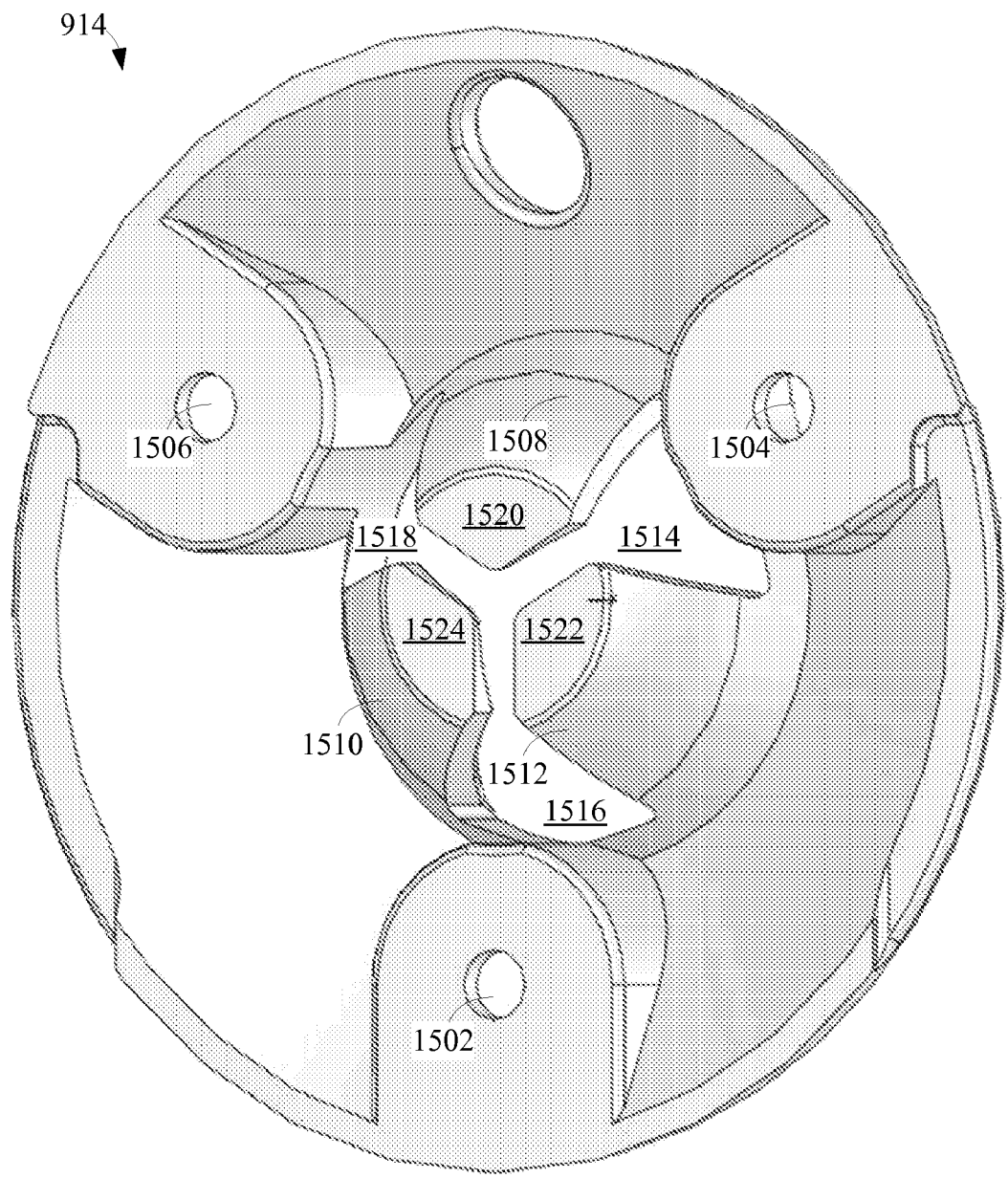
FIG. 15 shows a retaining shell for a ball and socket joint.

FIG. 15 shows a rear perspective view of the retaining shell 914. The retaining shell 914 has a generally circular construction consistent with the circular cross section of the socket 210 shown in FIG. 9. Apertures 1502, 1504, and 1506 receive fasteners, such as the fastener 908, that secure the retaining shell 914 in place in the socket 210 between the flat spring 902 and the ball 206.

The retaining shell 914 also includes multiple cantilevered flanges 1508, 1510, and 1512. The cantilevered flanges 1508-1512 may be sections of a circular shell that receive the ball 206. In other words, the retaining shell 914 has material removed in the areas 1514, 1516, and 1518 to form the cantilevered flanges 1508-1512. The cantilevered flanges 1508-1512 may be formed from a flexible and resilient plastic or other material and provide a mechanism that helps hold the mount 100 in place due to friction with the ball 206. The curved cantilevered flanges 1508-1512 transition into generally flat receiving sections 1520, 1522, and 1524 at one end. The flat spring 902 may exert a spring force against the receiving sections 1520, 1522, and 1524. In turn, the cantilevered flanges 1508-1512 and the receiving sections 1520-1524 exert force against the ball 206 that holds the mount 100 in the desired orientation, but that still allows the operator to reposition the mount 100.

Figure 16:
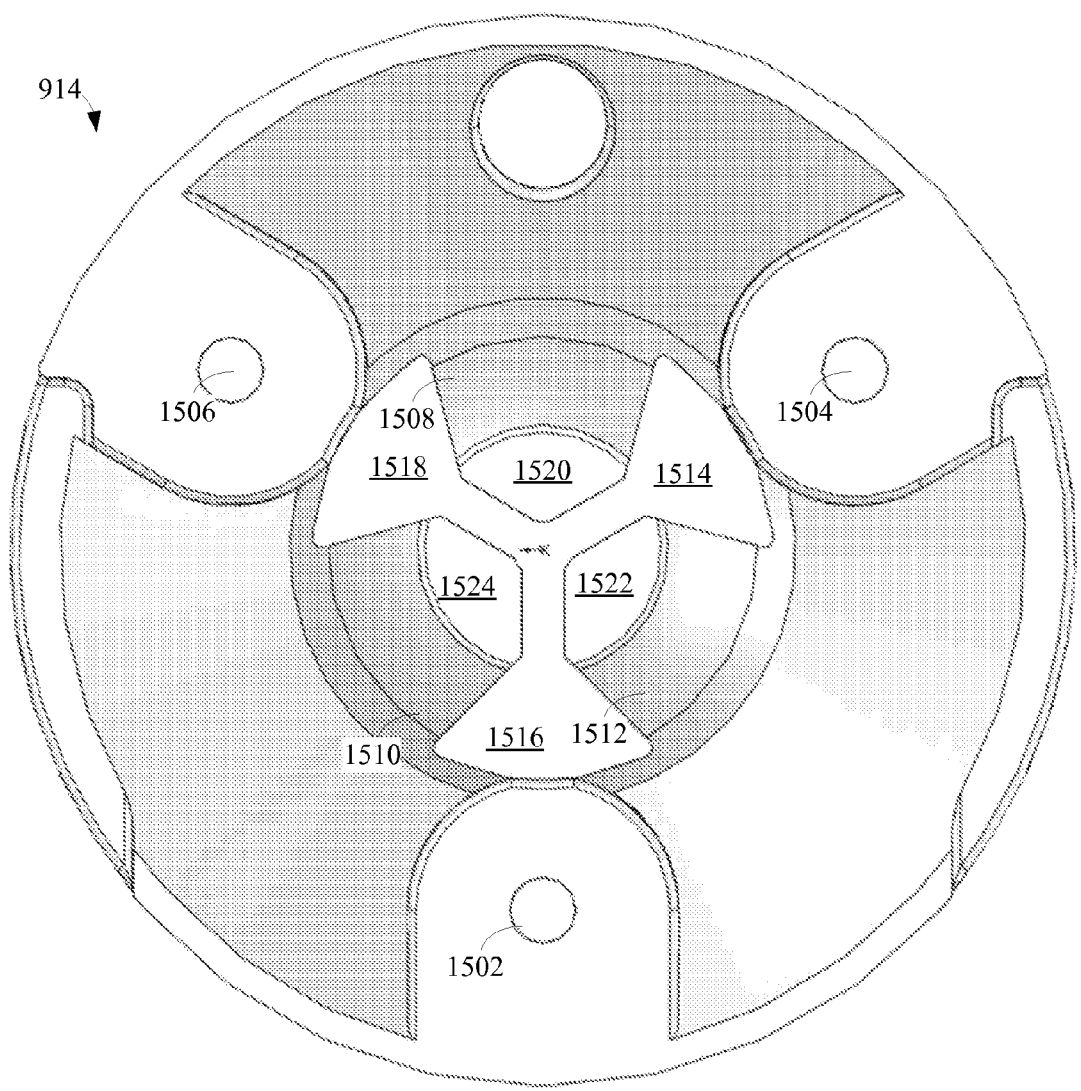
FIG. 16 shows a retaining shell for a ball and socket joint.
Figure 17:
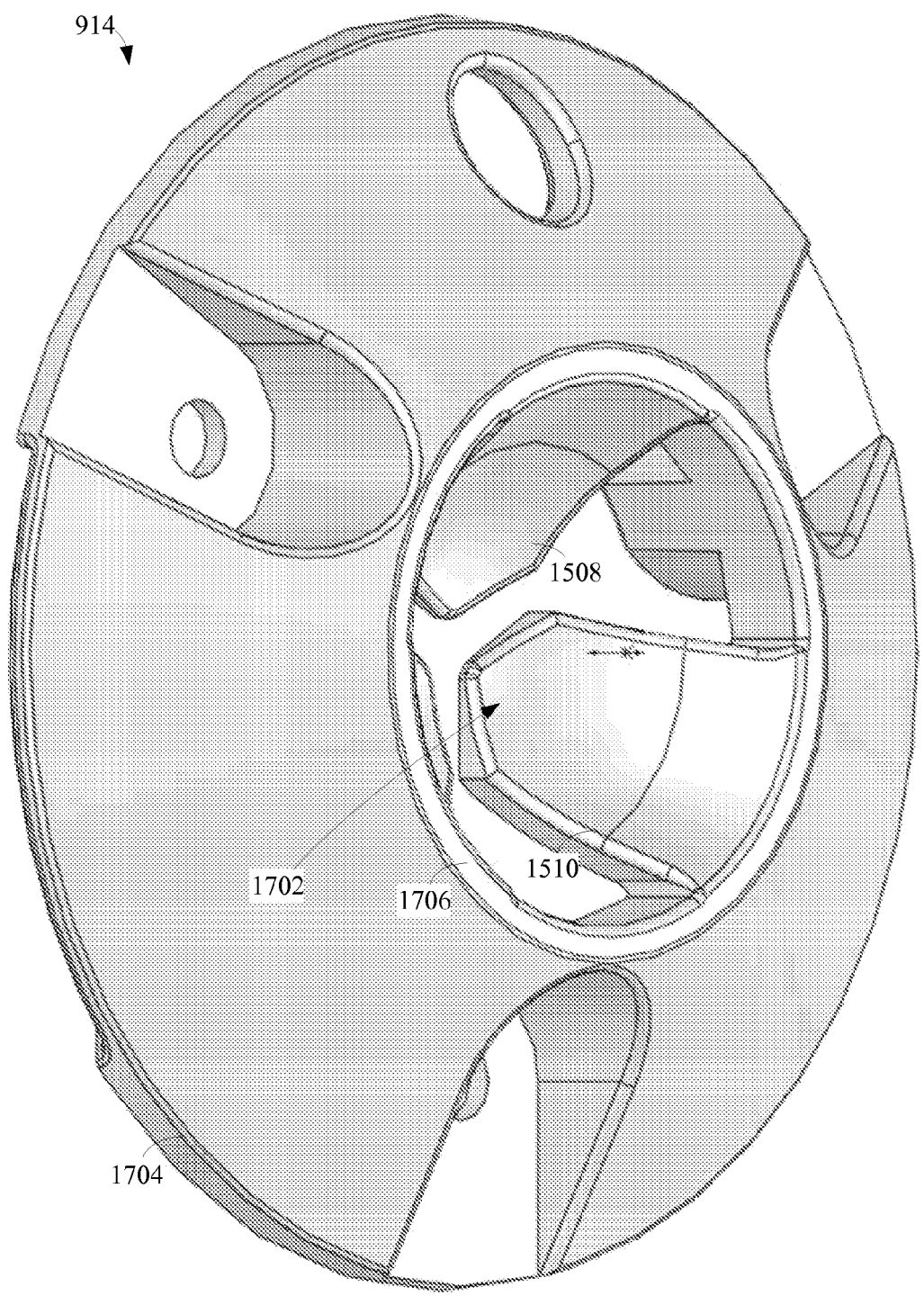
FIG. 17 shows a retaining shell for a ball and socket joint.

FIG. 16 shows a rear view of the retaining shell 914. FIG. 17 shows a front perspective view of the retaining shell 914. The ball 206 sits in the generally circular cavity 1702. FIG. 17 shows that the retaining shell 914 has a generally conical base starting from the outer radius 1704 to the inner radius 1706 where the cavity 1702 is defined. The cantilevered flanges 1508-1512 extend downward from the inner radius 1706 to form the cavity 1702.

While various embodiments of the voice detector have been described, it will be apparent to those of ordinary skill in the art that many more embodiments and implementations are possible within the scope of the invention. Accordingly, the invention is not to be restricted except in light of the attached claims and their equivalents.

What is claimed is:

1. A portable electronic device mount comprising:
   a backrest comprising:
      a socket comprising a cavity;
      a ball in the cavity, the ball comprising a diameter that retains the ball in the socket against an expected maximum force exerted during orientation of the backrest; and
      a flat spring that biases the ball against the socket;
   a retaining shell between the ball and the flat spring;
   where the flat spring comprises a planar portion in proximity with the ball, and a bend applying a force on the planar portion of the flat spring that brings the planar portion of the spring into firm and flexible contact with the retaining shell;
   a locking tab on a first side of the backrest;
   a lock release button on a second side of the backrest;
   a lock release mechanism coupled between the lock release button and the locking tab, the lock release mechanism including a release spring that biases the locking tab between an unlocked position and a locked position when the lock release button is pressed or released;
   a portable electronics device mating guide disposed on the backrest; and
   an electronics interface disposed on the backrest.

2. The mount of claim 1, further comprising:
   an extension arm connected to the ball and extending to an extension arm coupling under the backrest.

3. The mount of claim 1, where the lock release mechanism comprises a central member between the lock release button and the locking tab.

4. The mount of claim 1, where the retaining shell comprises a conical base, where the conical base of the retaining shell includes an inner radius within which the cavity is located.

5. The mount of claim 1, where:
   the locking tab comprises a first locking tab and a second locking tab, where the first and second locking tabs are positioned on opposite sides of and adjacent to the electronics interface.

6. The mount of claim 1, further comprising:
   a vibration damper on the backrest.

7. The mount of claim 6, where the vibration damper is adjacent the locking tab.

8. The mount of claim 1, where the retaining shell comprises a plurality of flanges that brace the ball.

9. The mount of claim 1 where the locking tab is disposed on a top side of the backrest and the lock release button is disposed on a bottom side of the backrest.

10. A portable electronic device mount comprising:
a backrest comprising:
a socket comprising a cavity;
a ball in the cavity, the ball comprising a diameter that retains the ball in the socket against an expected maximum force exerted during orientation of the backrest;
a spring that biases the ball against the socket;
a retaining shell between the ball and the spring;
wherein the spring comprises a planar portion in proximity with the ball, and a bend applying a force on the planar portion of the spring that brings the planar portion of the spring into firm and flexible contact with the retaining shell;
a locking tab on a first end of the backrest;
a lock release button on an opposing end of the backrest opposite from the first end; and
a lock release mechanism comprising a spring, the lock release mechanism coupled between the lock release button and the locking tab, the spring biasing the locking tab between an unlocked position and a locked position when the lock release button is pressed or released.

11. The mount of claim 10, further comprising standoffs extending substantially perpendicular from the backrest, where the standoffs dampen vibration effects on a portable electronic device mounted on the portable electronic device mount.

12. The mount of claim 10, further comprising:
an extension member connected to the ball;
an extension arm coupling that connects with the extension member;
a first extension arm coupled to a first side of the extension arm coupling; and
a second extension arm coupled to a side of the extension arm coupling opposite the first extension arm.

13. The mount of claim 10, further comprising:
a mounting surface attachment mechanism coupled to an extendible and retractable extension arm, where the mounting surface attachment mechanism comprises a torque pin, and where the extendible and retractable extension arm is coupled to the torque pin.

14. The mount of claim 10 where the lock release mechanism comprises a central member that is coupled with the locking tab, where toggling the lock release button causes the central member to displace the locking tab.

15. A portable electronic device mount comprising:
a backrest;
a locking tab on a first side of the backrest;
a lock release button on a second side of the backrest;
a lock release mechanism coupled between the lock release button and the locking tab, the lock release mechanism comprising a helical spring that biases the locking tab between an unlocked position and a locked position when the lock release button is pressed or released;
a portable electronics device mating guide on the backrest that aligns the portable electronic device;
a portable electronic device interface adjacent the locking tab; and
an interface port in the backrest that electrically couples with the portable electronic device interface, where the interface port is adjacent the locking tab.

16. The mount of claim 15, further comprising multiple feature specific connectors in the backrest and electrically coupled to the portable electronic device interface, where the multiple feature specific feature connectors comprise:
an audio-out connector, an external microphone connector, an external antenna connector, or combinations thereof.

17. The mount of claim 15, where the lock release button is located on an opposite side of the backrest from the lock release tab, and the mating guide is located adjacent the lock release button.

18. The mount of claim 15, where the lock release mechanism comprises:
a central member between the lock release button and locking tab; and
a release spring that biases the locking tab between an unlocked position and a locked position when the lock release button is pressed or released.

19. The mount of claim 15, where:
the locking tab comprises a first locking tab and a second locking tab, where the first and second locking tabs are positioned on opposite sides of and adjacent the portable electronic device interface, further where the interface port in the backrest is located between the first locking tab and the second locking tab.

20. The portable electronic device mount of claim 15, where the interface port accesses power signals and data signals from the portable electronic device.

21. The portable electronic device mount of claim 15, where the portable electronic device interface comprises a pin array configured to press against exposed contact pads of an electronic device when the electronic device is inserted into the mount.

* * * * *